Sept. 23, 1947. L. C. COLLYER 2,427,659
MECHANISM FOR FEEDING OR PROPELLING
BODIES OF UNIFORM CROSS-SECTION
Filed Sept. 24, 1945

INVENTOR
L.C. Collyer
BY Watson, Cole, Grindle & Watson
ATTORNEY

Patented Sept. 23, 1947

2,427,659

UNITED STATES PATENT OFFICE 2,427,659

MECHANISM FOR FEEDING OR PROPELLING BODIES OF UNIFORM CROSS-SECTION

Leonard Charles Collyer, London, England

Application September 24, 1945, Serial No. 618,076
In Great Britain October 13, 1944

11 Claims. (Cl. 198—50)

This invention relates to mechanism for feeding a continuous line or succession of articles of uniform cross-section in a predetermined path so that they can, for example, undergo some continuous treatment or process while in motion or be delivered at a given point in a predetermined manner. The invention is particularly applicable to cases in which the propelling mechanism is necessarily remote from the zone or region where the articles undergo treatment or from the delivery point. The articles or bodies which are so propelled may be in the form of short cylindrical bars, short bolts, nuts of similar size and shape, balls or other rigid articles of regular or constant cross-section and with their ends so shaped that they will abut and transmit the drive imparted to them when they are in line. For brevity such articles are hereafter referred to as slugs but this term must be interpreted as including a wide variety of articles, not necessarily of metal, capable of being propelled by the improved mechanism.

According to this invention mechanism for feeding or propelling slugs or other bodies of uniform cross-section comprises a pair of driving discs with their faces adjacent to one another, each mounted squarely on its own axis of rotation but slightly inclined to the axis of the other disc, a guide for feeding the slugs tangentially in the direction of rotation into the gap between the discs where the latter converge but before they reach their nearest point of approach so that the slugs can freely enter and are then gripped by the rotating discs, and a receiving guide at a point where the discs diverge, towards which the slugs are propelled by the discs and where they are released so that they can enter the guide. The guides are so placed that the slugs move in a path near the circumferential edges of the discs and a spring or like device is provided which tends to press the discs towards one another. Preferably the gap between the discs can be adjusted while a stop, which is also adjustable, may be provided to limit the extent to which they can approach one another. Similarly the guides may be adjustable as by being formed in two parts which can be moved towards or away from one another to suit the cross-section of the slugs.

Figure 1:
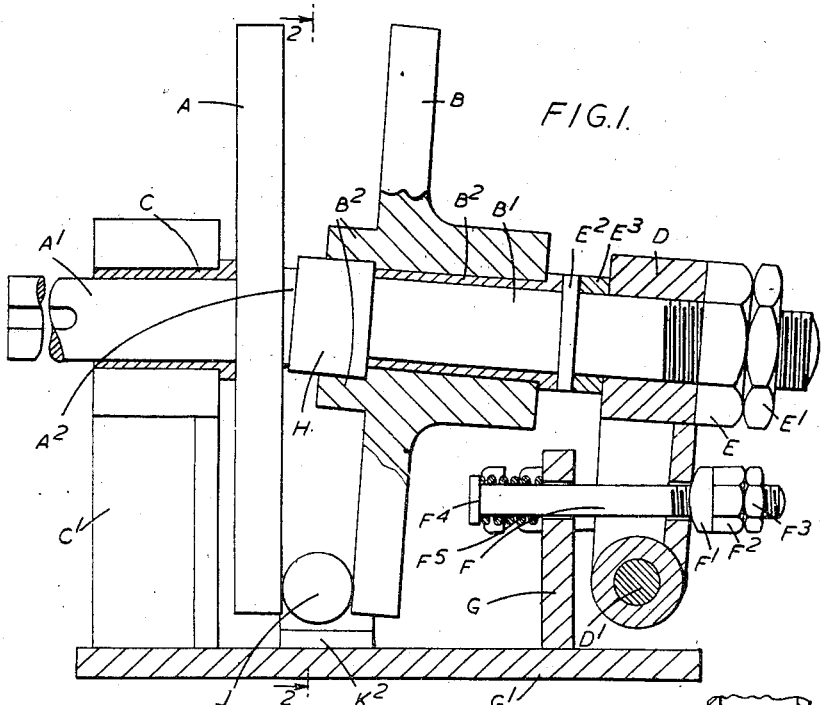
Figure 2:
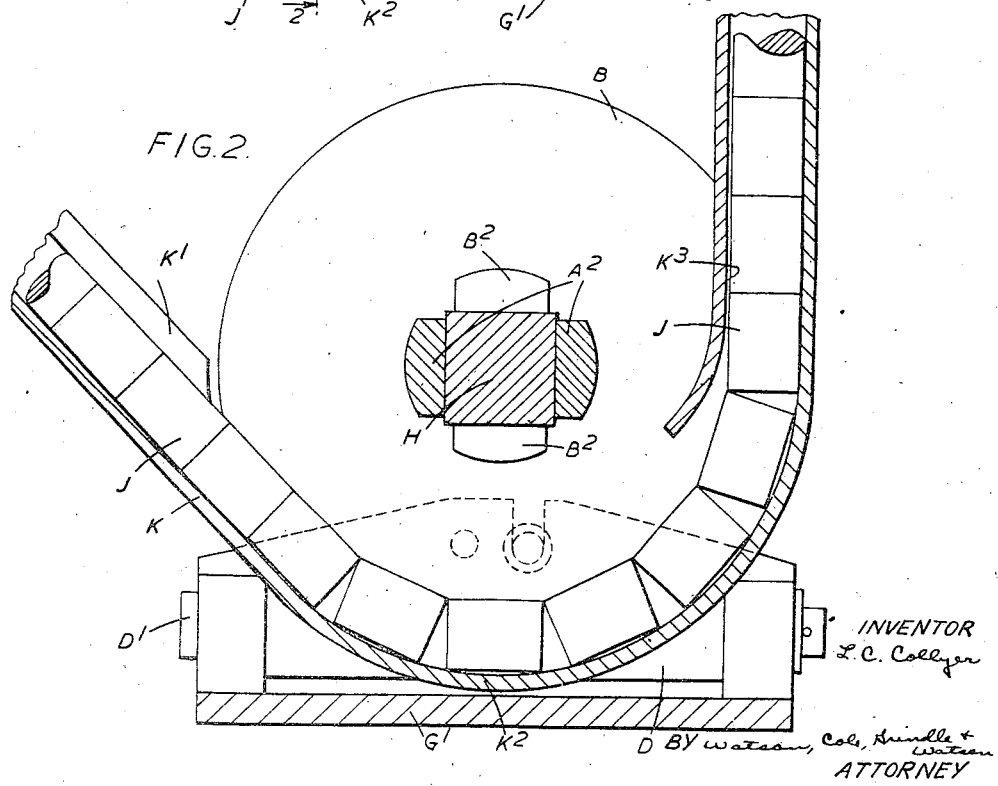

The invention may be carried into practice in various ways but one construction according to the invention is illustrated diagrammatically by way of example in the accompanying drawings, in which Figure 1 is a side elevation partly in section showing the two discs, and Figure 2 is a section in the plane of the line 2—2 of Figure 1.

In the construction illustrated the apparatus comprises a pair of driving discs A and B with their faces adjacent to one another the discs being mounted squarely on their shafts $A^1$ and $B^1$ by which they are rotated but the shafts being somewhat inclined to one another as by supporting the shaft $A^1$ in bearings C in a support $C^1$ so as to rotate on a truly horizontal axis while the shaft $B^1$ is rigidly supported in a bracket D hinged about a horizontal pivot $D^1$ so that the disc B will normally be inclined to the disc A and can be moved towards and away from it by the rocking movement of the bracket D, rotation of the disc B taking place on the shaft $B^1$ for which purpose a bearing $B^2$ is provided in the bore of the disc.

The shaft $B^1$ is rigidly secured to the bracket D by means of a thrust nut E and a locking nut $E^1$ engaging the screw-threaded end of the shaft and serving to draw a collar $E^2$ on the shaft $B^1$ into engagement with a horseshoe-shaped spacer $E^3$ interposed between the collar and the side of the bracket remote from the nuts E, $E^1$. It will be seen that by making the spacers $E^3$ horseshoe-shaped they can readily be removed and replaced and that by employing spacers $E^3$ of different thickness the position of the shaft $B^1$ and hence of the disc B relatively to the bracket can be adjusted as desired.

Means are provided tending to rock the bracket about its pivot pin so as to move the disc B towards the disc A, these means comprising a tension bolt F having a thrust washer and adjusting nuts $F^1$, $F^2$, $F^3$ at one end acting on the bracket and a head $F^4$ at the other end acted upon by one end of a compression spring $F^5$, the other end of which bears on a fixed lug or thrust member G on the main frame $G^1$ supporting the apparatus.

The shaft $A^1$ is adapted to be driven by some suitable mechanism, for example a pulley or chain wheel and rotation is transmitted from this shaft to the disc B by a coupling of the universal joint type comprising a fork $A^2$ projecting from the disc A, a similar fork $B^3$ projecting from the disc B and a rectangular intermediate block H interposed between the two forks so that two opposite sides thereof engage the sides of the fork $A^2$ while the other two opposite sides engage the sides of the fork $B^2$.

The slugs to be conveyed by the apparatus, as indicated at J, are fed down an inclined guide K having sides $K^1$ which is so disposed that the slugs enter the space between the discs A and B as they converge, the slugs then being guided as they pass into the narrowest part of the space between the discs so as to be gripped and fed forward, by a circumferential guide wall $K^2$ constituting an extension of the guide K. The slugs thus fed forward finally pass to a delivery guide or tube $K^3$ the outer wall of which constitutes an extension of the wall $K^2$, the arrangement being such that the slugs leave the discs at a point where they have diverged so as to free the slugs.

What I claim as my invention and desire to secure by Letters Patent is:

1. Mechanism for feeding forward bodies of approximately uniform cross-section including in combination a pair of rotatable discs mounted face-to-face with their axes of rotation inclined to one another, a supply guide by which the bodies are fed tangentially between the discs at a point where they converge but before they reach their nearest point of approach so that the bodies can freely enter between and are then gripped by the discs, and a delivery guide disposed at a point where the discs diverge and towards which the bodies are propelled by the discs and where they are released so as to enter the guide.

2. Mechanism for feeding forward bodies of approximately uniform cross-section including in combination a pair of rotatable discs mounted face-to-face with their axes of rotation inclined to one another, a supply guide by which the bodies are fed tangentially to a point adjacent to the circumference of the discs where they converge but before their nearest point of approach so that the bodies can freely enter between and are then gripped by the discs, a delivery guide disposed at a point where the discs diverge and towards which the bodies are propelled by the discs, and an intermediate circumferential guide extending around the part of the circumference of the discs traversed by the bodies and connecting the supply and delivery guides.

3. Mechanism for feeding forward bodies of approximately uniform cross-section including in combination a pair of rotatable discs mounted face-to-face with their axes of rotation inclined to one another, a supply guide by which the bodies are fed tangentially between the discs at a point where they converge but before they reach their nearest point of approach so that the bodies can freely enter between and are then gripped by the discs, a delivery guide disposed at a point where the discs diverge and towards which the bodies are propelled by the discs and where they are released so as to enter the guide, and spring means tending always to move the discs towards one another.

4. Mechanism for feeding forward bodies of approximately uniform cross-section including in combination a pair of rotatable discs mounted face-to-face with their axes of rotation inclined to one another, a supply guide by which the bodies are fed tangentially to a point adjacent to the circumference of the discs where they converge but before their nearest point of approach so that the bodies can freely enter between and are then gripped by the discs, a delivery guide disposed at a point where the discs diverge and towards which the bodies are propelled by the discs, an intermediate circumferential guide extending around the part of the circumference of the discs traversed by the bodies and connecting the supply and delivery guides, and spring means tending always to move the discs towards one another.

5. Mechanism for feeding forward bodies of approximately uniform cross-section including in combination a pair of rotatable discs mounted face-to-face with their axes of rotation inclined to one another, a supply guide by which the bodies are fed tangentially between the discs at a point where they converge but before they reach their nearest point of approach so that the bodies can freely enter between and are then gripped by the discs, a delivery guide disposed at a point where the discs diverge and towards which the bodies are propelled by the discs and where they are released so as to enter the guide, and means whereby the means distance between the discs can be adjusted.

6. Mechanism for feeding forward bodies of approximately uniform cross-section including in combination a pair of rotatable discs mounted face-to-face with their axes of rotation inclined to one another, a supply guide by which the bodies are fed tangentially between the discs at a point where they converge but before they reach their nearest point of approach so that the bodies can freely enter between and are then gripped by the discs, a delivery guide disposed at a point where the discs diverge and towards which the bodies are propelled by the discs and where they are released so as to enter the guide, spring means tending always to move the discs towards one another, and means whereby the mean distance between the discs can be adjusted.

7. Mechanism for feeding forward bodies of approximately uniform cross-section including in combination a pair of rotatable discs mounted face-to-face with their axes of rotation inclined to one another, a supply guide by which the bodies are fed tangentially between the discs at a point where they converge but before they reach their nearest point of approach so that the bodies can freely enter between and are then gripped by the discs, a delivery guide disposed at a point where the discs diverge and towards which the bodies are propelled by the discs and where they are released so as to enter the guide, means for driving one of the discs, and a universal joint type coupling whereby rotation is imparted from the said disc to the second disc.

8. Mechanism for feeding forward bodies of approximately uniform cross-section including in combination a pair of rotatable discs mounted face-to-face with their axes of rotation inclined to one another, a supply guide by which the bodies are fed tangentially between the discs at a point where they converge but before they reach their nearest point of approach so that the bodies can freely enter between and are then gripped by the discs, a delivery guide disposed at a point where the discs diverge and towards which the bodies are propelled by the discs and where they are released so as to enter the guide, spring means tending always to move the discs towards one another, means for driving one of the discs, and a universal joint type coupling whereby rotation is imparted from the said disc to the second disc.

9. Mechanism for feeding forward bodies of approximately uniform cross-section including in combination a pair of rotatable discs mounted face-to-face with their axes of rotation inclined to one another, a supply guide by which the bodies are fed tangentially between the discs at a point where they converge but before they reach their nearest point of approach so that the bodies can freely enter between and are then gripped by the discs, a delivery guide disposed at a point where the discs diverge and towards which the bodies are propelled by the discs and where they are released so as to enter the guide, means whereby the mean distance between the discs can be adjusted, means for driving one of the discs, and a universal joint type coupling whereby rotation is imparted from the said disc to the second disc.

10. Mechanism for feeding forward bodies of approximately uniform cross-section including in combination a pair of rotatable discs mounted face-to-face with their axes of rotation inclined to one another, a supply guide by which the bodies are fed tangentially between the discs at a point where they converge but before they reach their nearest point of approach so that the bodies can freely enter between and are then gripped by the discs, a delivery guide disposed at a point where the discs diverge and towards which the bodies are propelled by the discs and where they are released so as to enter the guide, spring means tending always to move the discs towards one another, means whereby the mean distance between the discs can be adjusted, means for driving one of the discs, and a universal joint type coupling whereby rotation is imparted from the said disc to the second disc.

11. Mechanism for feeding forward bodies of approximately uniform cross-section as claimed in claim 8, wherein the axis of the disc to which the drive is transmitted directly is fixed while the other disc is movable under the action of the spring means.

LEONARD CHARLES COLLYER.